(No Model.)
J. BLUE.
STALK CUTTER.
No. 461,309.  Patented Oct. 13, 1891.
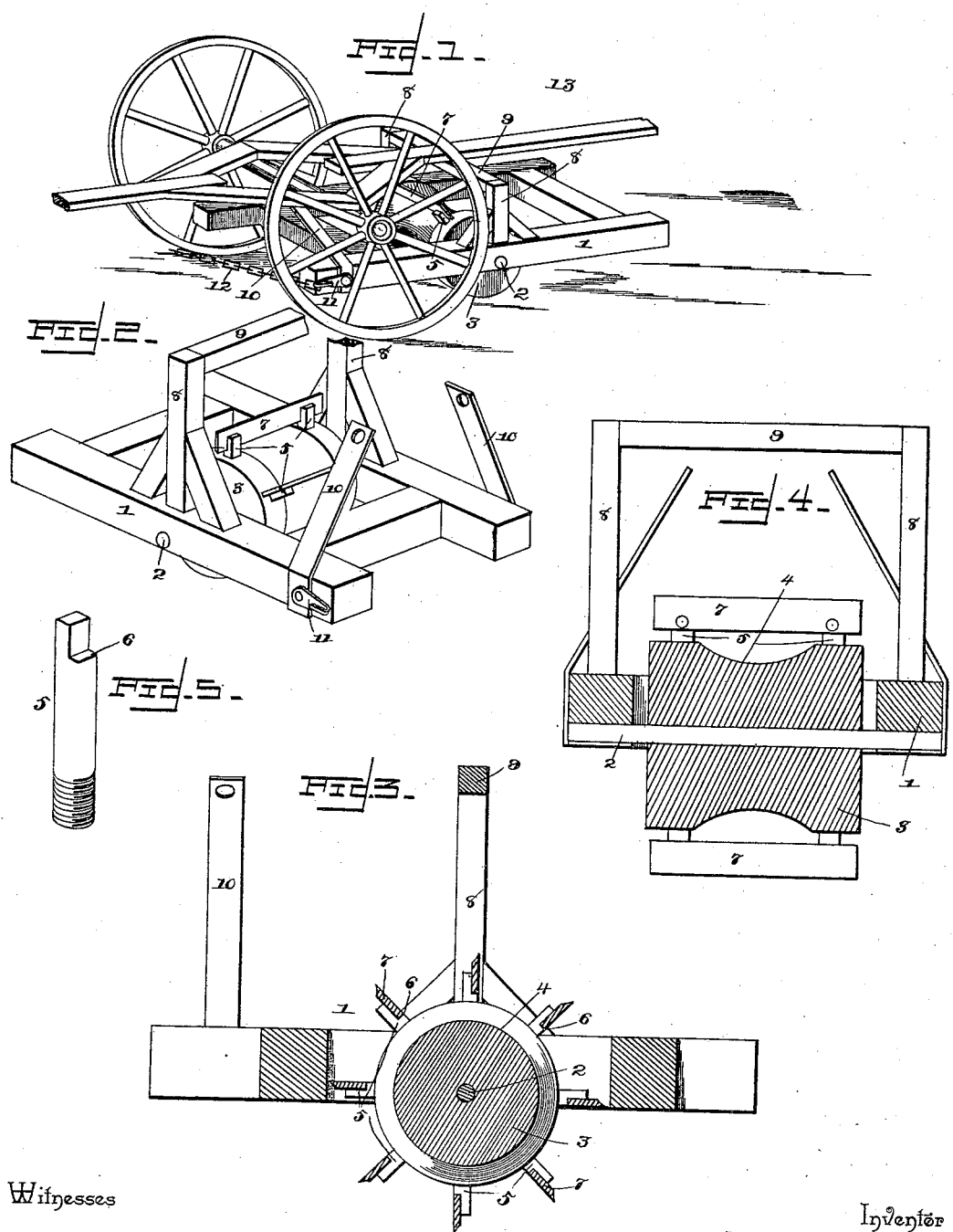
Witnesses
E. S. Duvall Jr.
Wm. Bagger
Inventor
John Blue.
By his Attorneys,
C. A. Snow & Co.

UNITED STATES PATENT OFFICE.

JOHN BLUE, OF LAURINBURG, NORTH CAROLINA, ASSIGNOR OF ONE-HALF TO JOHN M. McCORMICK, OF SAME PLACE.

STALK-CUTTER.

SPECIFICATION forming part of Letters Patent No. 461,309, dated October 13, 1891.

Application filed March 27, 1891. Serial No. 386,591. (No model.)

*To all whom it may concern:*

Be it known that I, JOHN BLUE, a citizen of the United States, residing at Laurinburg, in the county of Richmond and State of North Carolina, have invented a new and useful Stalk-Cutter, of which the following is a specification.

This invention relates to stalk-cutters; and it has for its object to provide a machine of this class which shall be simple in construction and efficient in operation, and which may be readily attached for operation to the running-gear of an ordinary wagon, thus dispensing with separate running-gear for the machine, and consequently cheapening the construction.

With these ends in view the invention consists in the improved construction, arrangement, and combination of parts, which will be hereinafter fully described, and particularly pointed out in the claims.

In the drawings hereto annexed, Figure 1 is a perspective view showing my improved stalk-cutter attached to the running-gear of a wagon in position for operation. Fig. 2 is a perspective view showing the stalk-cutter detached. Fig. 3 is a longitudinal sectional view of the same. Fig. 4 is a vertical transverse sectional view. Fig. 5 is a perspective detail view of one of the spokes by means of which the knives or cutters are secured to the revolving cylinder.

Like numerals of reference indicate like parts in all the figures.

The frame of my improved stalk-cutter, which is designated by 1, is preferably rectangular in shape, and the sides of said frame are provided with bearings for a shaft 2, carrying a drum or cylinder 3, the circumference of which has an annular concavity 4. Said drum or cylinder is provided near its ends with radially-extending spokes 5, which may be screwed into or otherwise suitably attached to said drum, and which are provided with shoulders 6 to support the knives or cutters 7, which are suitably secured to the said spokes parallel to the axis or shaft of the drum. The concavity 4 of the latter will permit the knives or cutters to cut deeply into the soil, thus severing the stalks which rest upon the surface of the ground.

The sides of the frame 1 are provided with uprights 8, suitably braced, and connected at or near their upper ends by a transverse bar 9. The sides of the frame are also provided near their front ends with upwardly-extending iron brackets 10, having perforations to receive bolts by means of which the said brackets may be connected with the hounds of a wagon running-gear. The sides of the frame are also provided near their front ends with hooks 11 for the attachment of stay-chains or draft-chains, (shown in Fig. 1 at 12,) said chains being suitably connected with the wagon running-gear for the purpose of drawing the machine over the field.

The operation of my invention will be readily understood by reference to Fig. 1 of the drawings, in which 13 designates an ordinary wagon running-gear with which my improved stalk-cutter is connected, the frame 1 being arranged directly under the front axle, while the brackets 10 are connected with the hounds by means of bolts or clips. The chains 12 connect the hooks 11 with a draft. The cross-bar 9, connecting the uprights 8 of the frame, is arranged directly below the reach-bar or coupling-pole upon which the operator is in practice seated, thus weighting the frame and forcing the cutters downwardly, so as to engage the stalks that are to be cut effectively.

The pressure upon the cutter-frame may be regulated by the position of the operator upon the coupling-pole, whereby more or less leverage may be gained, as may be desired.

The brackets 10, which connect the frame 1 with the hounds, will prevent the said frame from turning over.

The general construction of the device, as will be seen from the foregoing, is simple, durable, and efficient.

In some instances it may be found desirable to mount two or more drums or cylinders carrying knives or cutters in a single frame, and I desire it to be understood that I reserve the right to this and to any other modifications to which recourse may be had without departing from the spirit of my invention.

Having thus described my invention, I claim and desire to secure by Letters Patent of the United States—

1. In a stalk-cutter, the combination of a frame, a shaft journaled in the sides thereof and carrying a drum provided with knives or cutters, uprights mounted upon the side pieces of said frame and connected by a cross-bar adapted to support the reach-bar or coupling-pole of a wagon running-gear, and means for connecting the frame of the stalk-cutter with such running-gear, substantially as set forth.

2. In a stalk-cutter of the class described, the combination of a frame, the shaft journaled therein and carrying a drum or cylinder provided with knives or cutters, the brackets extending upwardly at the front end of said frame and adapted to be connected with the hounds of a wagon running-gear, and the uprights mounted upon the sides of the frame and connected by a cross-bar adapted to support the reach or coupling-pole of such running-gear, substantially as and for the purpose set forth.

In testimony that I claim the foregoing as my own I have hereto affixed my signature in presence of two witnesses.

JOHN BLUE.

Witnesses:
LUTHER AYDLOTT,
M. J. EDWARDS.